(12) United States Patent
Adams et al.

(10) Patent No.: US 10,539,252 B2
(45) Date of Patent: *Jan. 21, 2020

(54) AERODYNAMIC NOISE REDUCTION CAGE

(71) Applicant: FISHER CONTROLS INTERNATIONAL LLC, Marshalltown, IA (US)

(72) Inventors: Daniel M. Adams, Marshalltown, IA (US); Allen C. Fagerlund, Marshalltown, IA (US); James L. Gossett, Marshalltown, IA (US); Patrick L. O'Shea, Marshalltown, IA (US); Daniel J. Eilers, Marshalltown, IA (US); William E. Wears, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 107 days.

This patent is subject to a terminal disclaimer.

(21) Appl. No.: 15/673,697

(22) Filed: Aug. 10, 2017

(65) Prior Publication Data
US 2018/0003318 A1    Jan. 4, 2018

Related U.S. Application Data

(62) Division of application No. 14/714,906, filed on May 18, 2015, now Pat. No. 9,759,348.

(51) Int. Cl.
*F16K 47/08* (2006.01)
*F16K 3/24* (2006.01)

(52) U.S. Cl.
CPC .............. *F16K 47/08* (2013.01); *F16K 3/246* (2013.01)

(58) Field of Classification Search
None
See application file for complete search history.

(56) References Cited

U.S. PATENT DOCUMENTS 3,514,074 A * 5/1970 Self .................. F16K 47/08
                                                137/625.28
4,267,045 A    5/1981 Hoof
(Continued)

FOREIGN PATENT DOCUMENTS

CN    100386551 C    5/2008
CN    101910696 A    12/2010
(Continued)

OTHER PUBLICATIONS

International Search Report and Written Opinion for PCT/US2016/032973 dated Aug. 30, 2016.
(Continued)

*Primary Examiner* — John Fox
(74) *Attorney, Agent, or Firm* — Marshall, Gerstein & Borun LLP

(57) ABSTRACT

A control valve has a body having an inlet and outlet, a valve seat between the inlet and outlet, a valve plug, and a cage adjacent the valve seat to provide guidance for the valve plug. The valve plug is movable between a closed position, where the valve plug sealingly engages the valve seat, and an open position, where the valve plug is spaced away from the valve seat. The cage has a solid, unitary circumferential wall having inner and outer surfaces and a plurality of passages formed through the wall. Each passage extends between the inner and outer surfaces and follows an arcuate, non-linear path from the inner surface to the outer surface.

14 Claims, 11 Drawing Sheets

(56) References Cited

U.S. PATENT DOCUMENTS

| | | |
|---|---|---|
| 4,817,374 A | 4/1989 | Kitta |
| 6,161,584 A | 12/2000 | Hemme et al. |
| 6,505,646 B1 | 1/2003 | Singleton |
| 6,935,370 B2 | 8/2005 | McCarty et al. |
| 7,089,961 B2 | 8/2006 | Morton et al. |
| 7,967,028 B2 | 6/2011 | Jinno et al. |
| 8,826,938 B2 | 9/2014 | Moore |
| 8,881,768 B2 | 11/2014 | Haines et al. |
| 9,046,184 B2 | 6/2015 | Micheel et al. |
| 2005/0199298 A1 | 9/2005 | Farrington |
| 2009/0026395 A1 | 1/2009 | Perrault et al. |
| 2009/0183790 A1 | 7/2009 | Moore |
| 2012/0285546 A1 | 11/2012 | Ter Haar et al. |

FOREIGN PATENT DOCUMENTS

| | | |
|---|---|---|
| CN | 101910698 A | 12/2010 |
| CN | 201909105 U | 7/2011 |
| CN | 203421279 U | 2/2014 |
| CN | 103946613 A | 7/2014 |
| CN | 204062133 U | 12/2014 |
| EP | 3009723 A1 | 4/2016 |
| JP | H11248033 A | 9/1999 |
| WO | WO-2009094077 A1 | 7/2009 |

OTHER PUBLICATIONS

Notification of the First Office Action for CN Application No. 201610329305.6 dated Jan. 4, 2019.

\* cited by examiner

AERODYNAMIC NOISE REDUCTION CAGE

CROSS-REFERENCE TO RELATED APPLICATIONS

This application is a divisional of U.S. patent application Ser. No. 14/714,906, entitled "Aerodynamic Noise Reduction Cage" and filed May 18, 2015, the entire disclosure of which is hereby incorporated by reference herein.

FIELD OF THE DISCLOSURE

This disclosure relates generally to control valves and, more particularly, aerodynamic noise reducing cages for control valves.

BACKGROUND

In typical control valves, a valve cage may provide guidance for a valve plug as the valve plug moves from a closed position in which the valve plug sealingly engages a valve seat to an open position in which the valve plug is disposed away from the valve seat. When the valve is in the open position, fluid flows from a valve inlet, passes through a passage between the valve seat and the valve plug, passes through the valve cage, and exits through a valve outlet. In addition to guiding the valve plug, a valve cage can also be used for additional functions, such as noise reduction.

Referring to FIG. 1, a typical control valve 10 is shown. Control valve 10 generally includes a valve body 12 having an inlet 14 and an outlet 16 and a passageway 18 disposed between inlet 14 and outlet 16. A valve seat 24 is disposed in passageway 18 between inlet 14 and outlet 16 and a solid cage 22 is disposed within valve body 12 adjacent valve seat 24. A fluid control member, such as valve plug 26, is positioned within body 12 and is disposed within cage 22. Valve plug 26 interacts with the valve seat 24 to control fluid flow through the body 12, such that valve plug 26 sealingly engages valve seat 24 in a closed position and is spaced away from valve seat 24 in an open position. A stem 28 is connected to valve plug 26 at one end and to an actuator 30 at another end. Actuator 30 controls movement of valve plug 26 within cage 22. The cage 22 is positioned adjacent valve seat 24 and proximate valve plug 26 to provide guidance for valve plug 26.

In some gas applications, cage 22 has a plurality of passages 20 formed through a circumferential wall of cage 22, which are used is to reduce the noise produced as the gas passes through cage 22. Passages 20 are spaced specifically such that the jets of gas that are produced as the gas exits passages 20 do not converge and produce aerodynamic noise. Cages 22 used in these types of gas applications are typically used in a "flow up" orientation (e.g., the gas enters the center of cage 22 and passes from an inside surface to an outside surface of cage 22) and the spacing of passages 20 that is crucial to reduce the aerodynamic noise is on the outer surface of cage 22. The spacing of passages 20 on the inner surface of cage 22 is also important, as this spacing is used to keep sufficient space between passages 20 to not allow flow to pass through more passages 20 than desired for accurate flow characteristics throughout the travel of valve plug 26.

For solid cages 22 used in gas applications where the process conditions produce aerodynamic noise as the medium flows through control valve 11, drilled holes through the circumferential wall of cage 22 are typically used to form passages 20. However, drilled hole cages are very cumbersome, time consuming, and costly to produce. Some drilled hole cages may contain thousands of holes and the only real feasible way to produce passages 20 was to drill them with a ⅛ inch drill bit. Acceptance criteria exists that allows a percentage of drill bits to break and be left in the cage and this process requires the use of special drilling machines that have a high degree of accuracy.

In addition to the spacing of passages 20 on the outer surface of cage 22, aerodynamic noise can also be reduced by providing a tortured, or non-linear, flow path for passages 20 or to varying the cross-sectional diameter of passages 20 as they pass through the wall of cage 22. However, with a drilled holes through a solid cage 22, creating passages 20 having a non-linear flow path or having a variable cross-sectional area is not possible.

In addition to the noise issues that can be encountered in some gas applications, in some liquid applications, conditions can occur that will produce a condition where the liquid cavitates, which can cause severe damage to control valve 10. In order to reduce the cavitation that can occur to the point that it does not damage control valve 10 or to direct it to an area that is less susceptible to cavitation damage, passages that decrease in diameter in the direction of fluid flow can be used.

However, using drilled holes and conventional manufacturing techniques to create passages 20 in a solid cage 22 requires that the holes be step drilled from the outer surface of the cage, which limits these holes to having the larger diameter portion of passage 20 on the outer surface of cage 22 and the smaller diameter portion of passage 20 on the inner surface of cage 22, since the larger diameter portion has to be drilled from the outside of cage 22. This limits these types of cages 22 to applications using a "flow down" orientation (e.g., the fluid enters cage 22 from the outer surface and passes from the outside surface to the inside surface of cage 22) so that the pressure drops can be reduced as the flow goes through the control valve 10 and then downstream. The overriding reason this is done in this manner is the ability to drill the stepped holes from the outside of cage 22. As described above, drilling the number of holes required through the wall of cage 22 for this type of application is very cumbersome, time consuming, and costly to produce.

BRIEF SUMMARY OF THE DISCLOSURE

In accordance with one exemplary aspect of the present invention, a control valve comprises a body having an inlet and an outlet, a valve seat positioned in a passageway of the body between the inlet and the outlet, a valve plug positioned within the body, and a cage disposed within the body adjacent the valve seat and proximate the valve plug to provide guidance for the valve plug. The valve plug is movable between a closed position, in which the valve plug sealingly engages the valve seat, and an open position, in which the valve plug is spaced away from the valve seat. The cage comprises a solid, unitary circumferential wall having an inner surface and an outer surface and a plurality of passages formed through the wall and extending between the inner surface and the outer surface. Each of the passages follows an arcuate, non-linear path from the inner surface to the outer surface.

In accordance with another exemplary aspect of the present invention, a cage for a control valve comprises a solid, unitary circumferential wall having an inner surface and an outer surface and a plurality of passages formed through the wall and extending between the inner surface and the outer surface. Each of the passages follows an arcuate, non-linear path from the inner surface to the outer surface.

In further accordance with any one or more of the foregoing exemplary aspects of the present invention, a control valve or cage for a control valve may further include, in any combination, any one or more of the following preferred forms.

In one preferred form, the arcuate, non-linear path is helical.

In another preferred form, the arcuate, non-linear path is spiral.

In another preferred form, each of the passages comprises a non-circular cross-sectional area.

In another preferred form, the cross-sectional area is one of a square, a rectangle, a triangle, an oval, a stars, a polygon, and an irregular shape.

In another preferred form, a sealed cavity is formed in the wall of the cage.

In another preferred form, the wall has a first end and a second end and the sealed cavity is spaced apart from the inner surface, the outer surface, the first end, and the second end of the wall.

In another preferred form, each of the passages comprises a cross-sectional area that varies from the inner surface to the outer surface.

DETAILED DESCRIPTION

Figure 1:
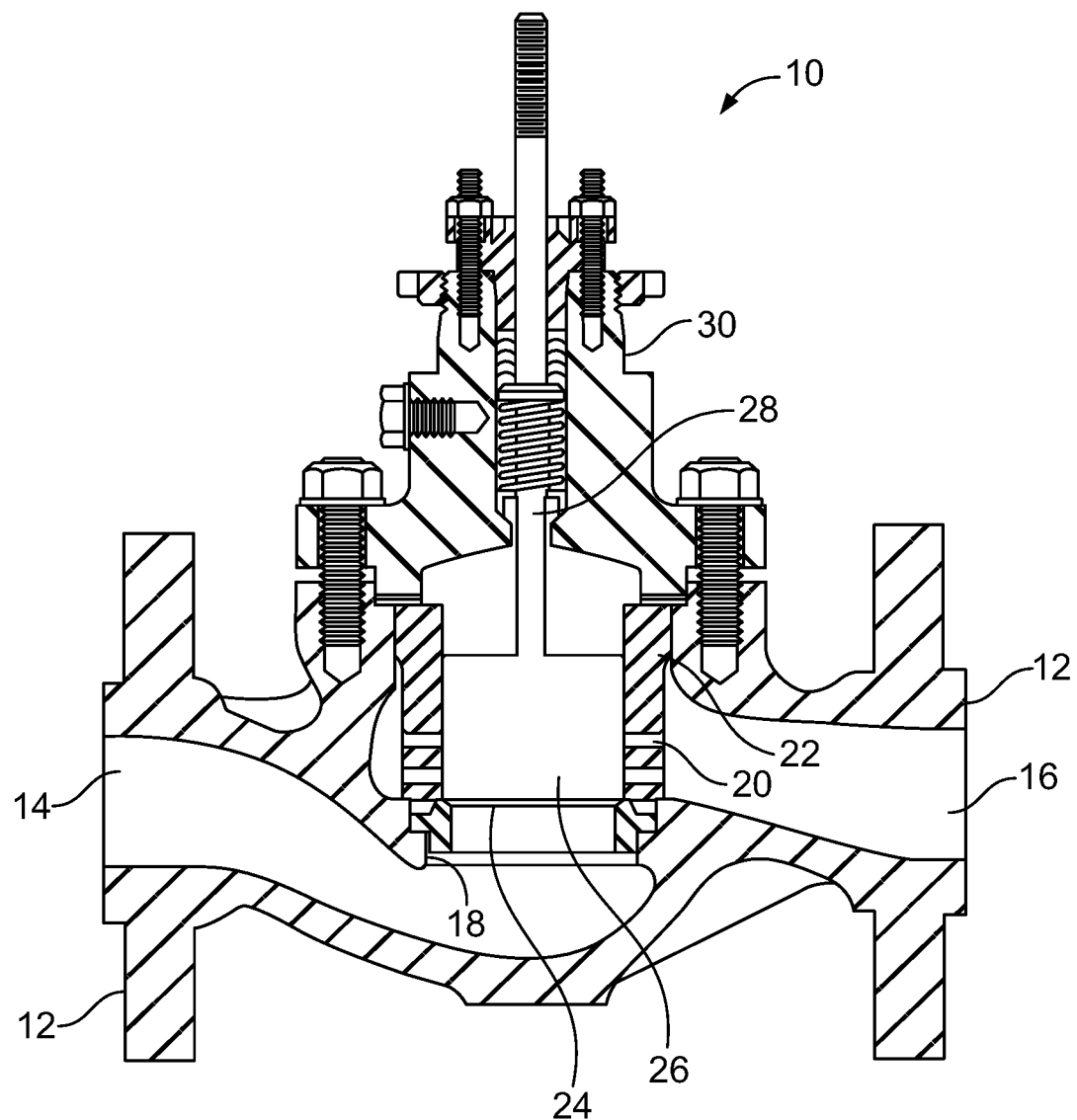
FIG. 1 is a cross-sectional view of an example control valve.
Figure 2A:
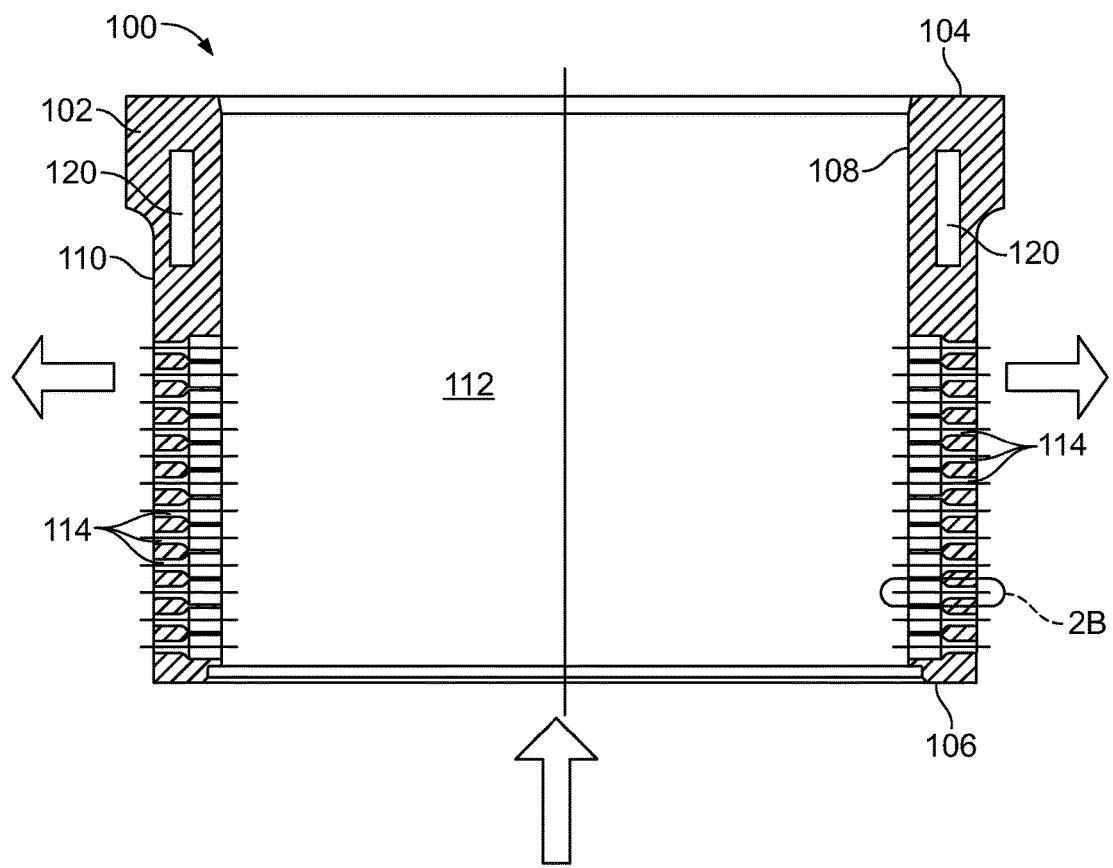
FIG. 2A is a cross-sectional view of an example cage that can be used with the control valve of FIG. 1.
Figure 2B:
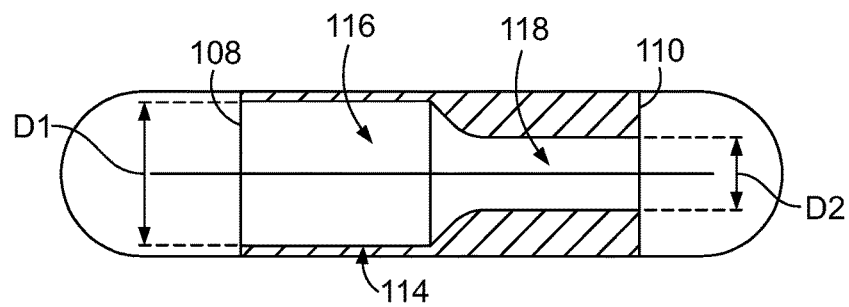
FIG. 2B is an enlarged portion of the indicated portion of FIG. 2A.
Figure 3A:
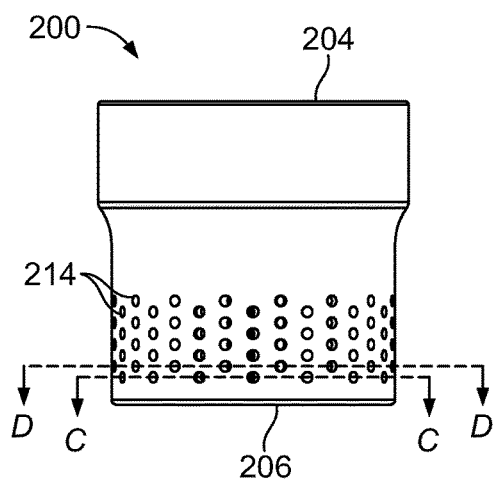
FIG. 3A is a side view of a second example cage that can be used with the control valve of FIG. 1.
Figure 3B:
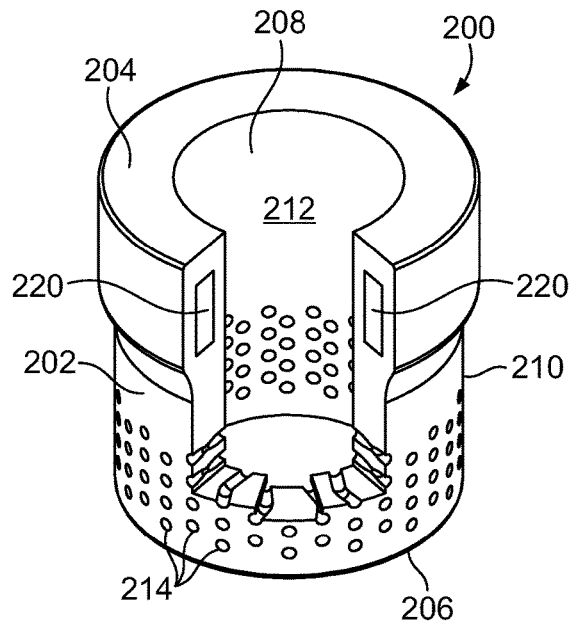
FIG. 3B is a perspective view of the example cage of FIG. 3A with a portion removed to expose the passages.
Figure 3C:
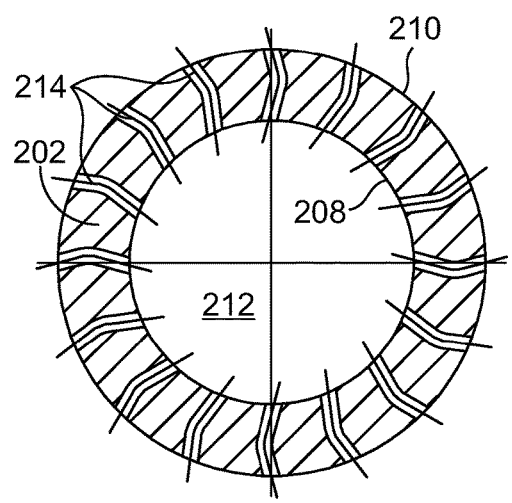
FIG. 3C is a top cross-sectional view of the cage of FIG. 3A taken along the line C-C in FIG. 3A.
Figure 3D:
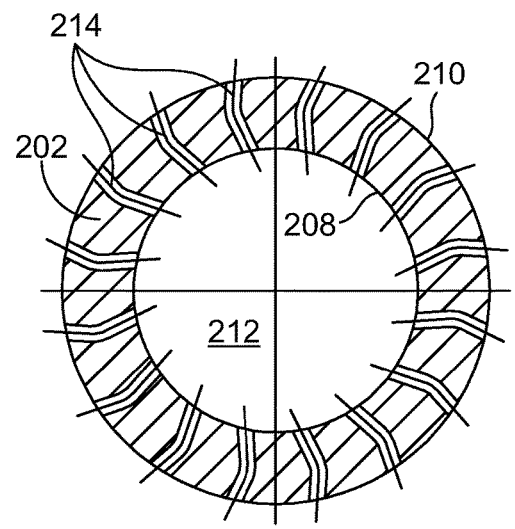
FIG. 3D is a top cross-sectional view of the cage of FIG. 3A taken along the line D-D in FIG. 3A.

Referring to FIGS. 2A-2B, one example of a cage 100 is shown that can be used with the control valve 10 described above and shown in FIG. 1. Cage 100 can be manufactured using Additive Manufacturing Technology, such as direct metal laser sintering, full melt powder bed fusion, etc. Using an Additive Manufacturing Technology process, the 3-dimensional design of cage 100 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed cage 100.

Using an Additive Manufacturing Technology process to manufacture cages for control valves allows the freedom to produce passages having various shapes and geometries, and other feature described below, that are not possible using current standard casting or drilling techniques. For example, as described above, cages used in liquid applications can be manufactured having passages that decrease in diameter in the direction of fluid flow to reduce cavitation in the control valve. However, using standard manufacturing techniques, these cages were limited to applications using a "flow down" orientation as the larger diameter portion of each passages could only be drilled/machined on the outer surface of the cage. However, as shown in FIGS. 2A-2B, cage 100 can now be manufactured having passages that decrease in diameter from the inner surface to the outer surface, allowing cage 100 to be used in applications using a "flow up" orientation, which was not previously possible.

As shown in FIGS. 2A-2B, cage 100 generally includes a circumferential wall 102 forming a hollow central bore 112, within which the valve plug 26 will slide to control fluid flow through cage 100. Wall 102 defines a first end 104, an opposing second end 106, an inner surface 108, and an opposing outer surface 110. Passages 114 are formed through wall 102, extend between inner surface 108 and outer surface 110, and each have a first portion 116 and a second portion 118. Passages 114 can be used to characterized fluid flowing through cage 100 by, for example, reducing the pressure of the fluid as it flows through passages 114. First portion 116 of each passage 114 extends from inner surface 108 partially into wall 102 and has a first diameter D1, or cross-sectional area if passages 114 are not circular. Second portion 118 of each passage 114 extends from outer surface 110 partially into wall 102 and a second diameter D2, or cross-sectional area if passages 114 are not circular, that is smaller than diameter D1 of first portion 116.

Having passages 114 decrease in diameter from inner surface 108 to outer surface 110, which was not possible using standard manufacturing methods, means that cage 100 can now be used in liquid applications to reduce cavitation in control valves having a "flow up" orientation, which was not previously possible, and the design is not restricted from a manufacturing standpoint. This can be beneficial as some control valves perform better with increased capacity and control in the "flow up" orientation. In addition, having cages that can be in either "flow up" or "flow down" orientations allows piping flexibility to end users for any given application and provides more flexibility for more seal configurations, which can be flow direction dependent.

As described above, passages 114 can have a generally circular cross-sectional area with a longitudinal axis that is perpendicular to the longitudinal axis of cage 100. However, passages can also have other non-circular cross-sectional area, such as square, rectangle, triangle, oval, star, polygon, and irregular shapes. Furthermore, a sealed cavity 120, such as a "lightning hole" or "weight saver" or manifold, can also be formed in wall 102 of cage 100, to reduce the weight of cage 100 and save material, which was not possible using standard manufacturing techniques. Even with one or more of the above described features, such as passages 114 with decreasing diameter, passages 114 with non-circular cross sections, and/or sealed cavities 120 formed in wall 102 of cage 100, using an Additive Manufacturing Technology, wall 102 can still be a solid, unitary structure.

Referring to FIGS. 3A-D, a second example of a cage 200 is shown that can be used with the control valve 10 described above and shown in FIG. 1. Cage 200 can also be manufactured using an Additive Manufacturing Technology process described in detail above for cage 100.

As shown in FIGS. 3A-D, cage 200 generally includes a solid, unitary circumferential wall 202 forming a hollow central bore 212, within which the valve plug 26 will slide to control fluid flow through cage 200. Wall 202 defines a first end 204, an opposing second end 206, an inner surface 208, and an opposing outer surface 210. Passages 214 are formed through wall 202 and extend between inner surface 208 and outer surface 210. Passages 214 can be used to characterized fluid flowing through cage 200 by, for example, reducing the pressure of the fluid as it flows through passages 214 or providing a tortured flow path through wall 202 to reduce the velocity of the fluid flowing through cage 200.

In the example shown in FIGS. 3A-D, passages 214 are arcuate and follow a non-linear path from inner surface 208 to outer surface 210 of wall 202. As can best be seen in FIGS. 3C-D, passages 214 at vertically adjacent locations in cage 200 can curve in opposite directions, which provides a tortured flow path for the fluid passing through cage 200 and directs the exhaust from each vertically adjacent passages in different directions to avoid convergence of the exhaust paths and avoid producing aerodynamic noise. In the example shown, passages 214 formed in the first row of passages (FIG. 3C) curve from right to left and passages 214 formed in the second row of passages (FIG. 3D) curve from left to right. Rows of passages 214 will continue to alternate the direction of curvature so that each row of passages will exhaust in a direction different that the adjacent rows.

As described above, passages 214 can have a generally circular cross-sectional area. However, passages 214 can also have other non-circular cross-sectional areas, such as square, rectangle, triangle, oval, star, polygon, and irregular shapes. In addition, the cross-sectional area of passages 214 can vary from inner surface 208 to outer surface 210. For example, passages 214 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210. Furthermore, a sealed cavity 220, such as a "lightning hole" or "weight saver" or manifold, can also be formed in wall 202 of cage 200, to reduce the weight of cage 200 and save material, which was not possible using standard manufacturing techniques.

Figure 4A:
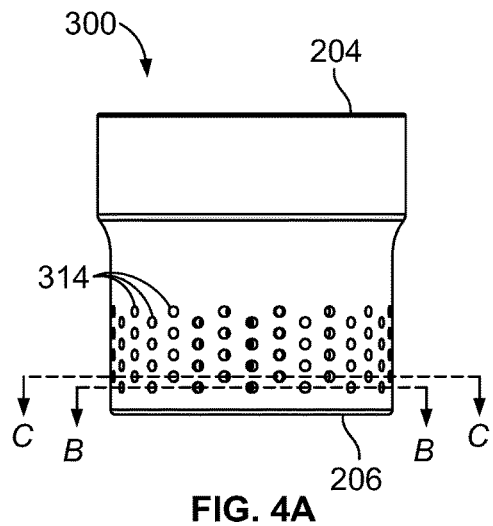
FIG. 4A is a side view of a third example cage that can be used with the control valve of FIG. 1.
Figure 4B:
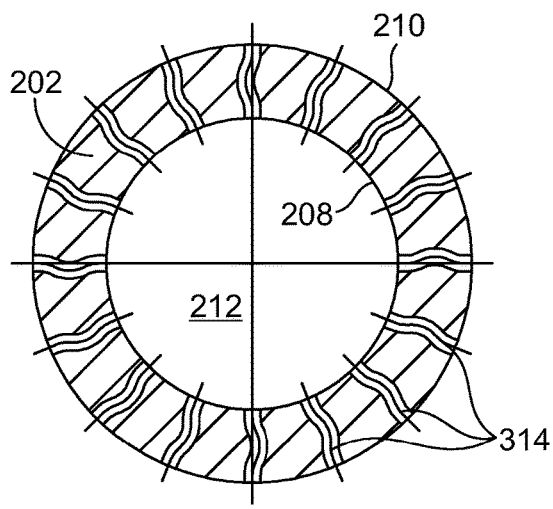
FIG. 4B is a top cross-sectional view of the cage of FIG. 4A taken along the line B-B in FIG. 4A.
Figure 4C:
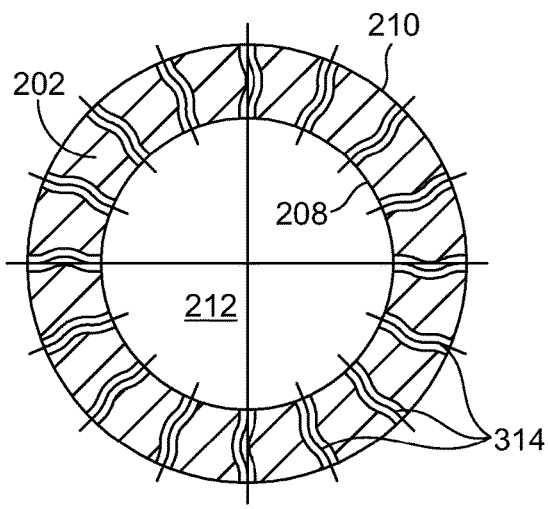
FIG. 4C is a top cross-sectional view of the cage of FIG. 4A taken along the line C-C in FIG. 4A.

FIGS. 4A-C illustrate a third example of a cage 300 that can be used with the control valve 10 described above and shown in FIG. 1. Cage 300 can also be manufactured using an Additive Manufacturing Technology process described in detail above for cage 100. Cage 300 is identical to cage 200 described above and uses the same reference numbers for identical parts, except that the rows of passages have the opposite curvature from those shown in cage 200. For example, first row of arcuate, non-linear passages 314 (FIG. 4B) curve from left to right, the second row of passages (FIG. 4C) curve from right to left, and the rows of passages 314 continue to alternate.

As described above, passages 314 can have a generally circular cross-sectional area. However, passages 314 can also have other non-circular cross-sectional areas, such as square, rectangle, triangle, oval, star, polygon, and irregular shapes. In addition, the cross-sectional area of passages 314 can vary from inner surface 208 to outer surface 210. For example, passages 314 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210.

Figure 5A:
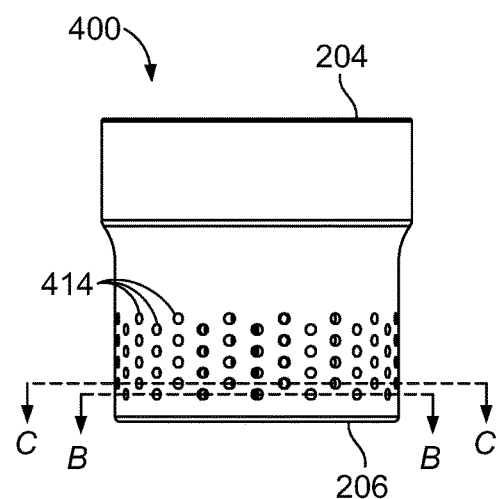
FIG. 5A is a side view of a fourth example cage that can be used with the control valve of FIG. 1.
Figure 5B:
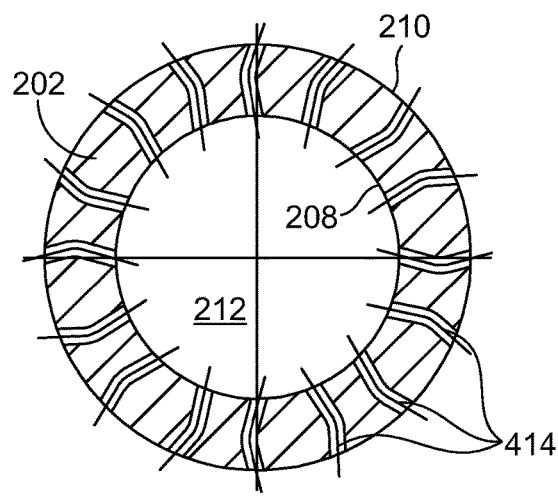
FIG. 5B is a top cross-sectional view of the cage of FIG. 5A taken along the line B-B in FIG. 5A.
Figure 5C:
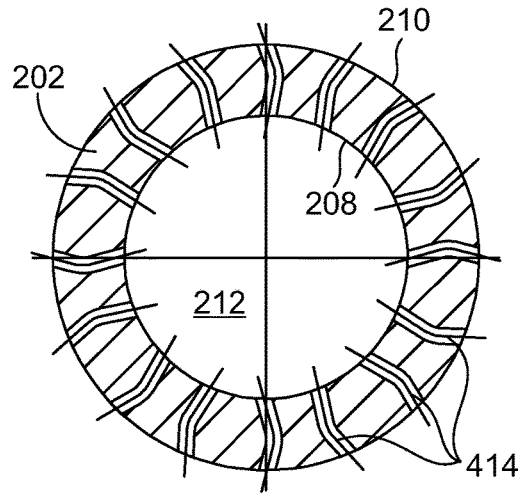
FIG. 5C is a top cross-sectional view of the cage of FIG. 5A taken along the line C-C in FIG. 5A.
Figure 6A:
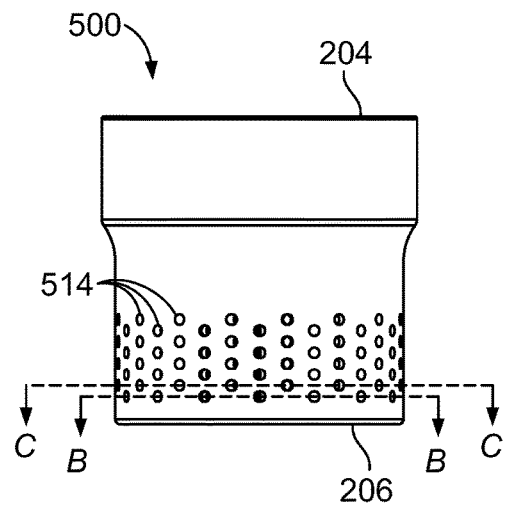
FIG. 6A is a side view of a fifth example cage that can be used with the control valve of FIG. 1.
Figure 6B:
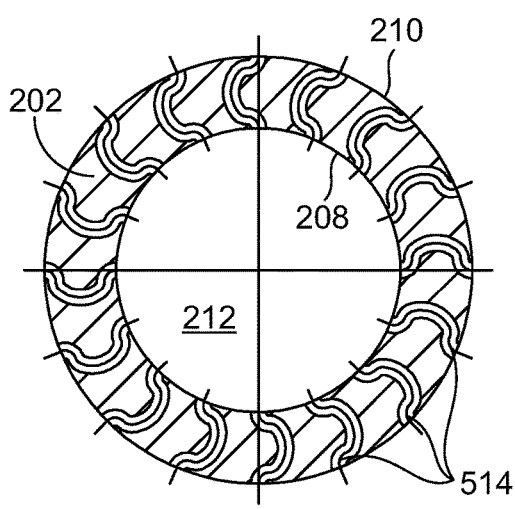
FIG. 6B is a top cross-sectional view of the cage of FIG. 6A taken along the line B-B in FIG. 6A.
Figure 6C:
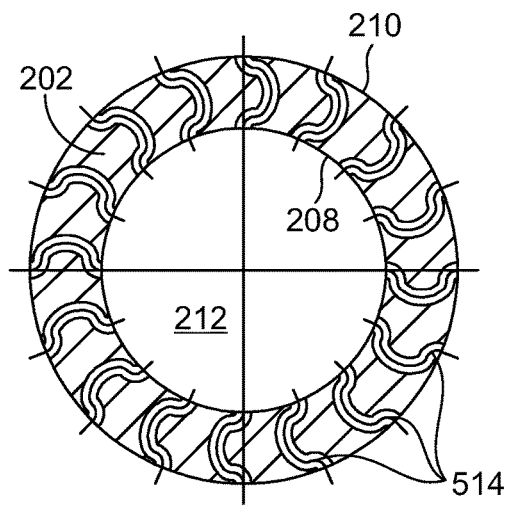
FIG. 6C is a top cross-sectional view of the cage of FIG. 6A taken along the line C-C in FIG. 6A.
Figure 7A:
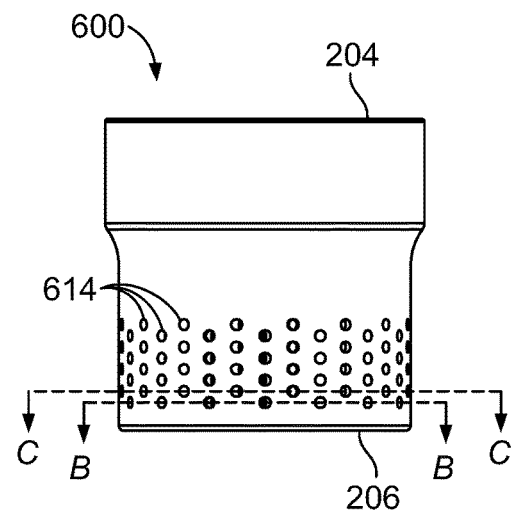
FIG. 7A is a side view of a sixth example cage that can be used with the control valve of FIG. 1.
Figure 7B:
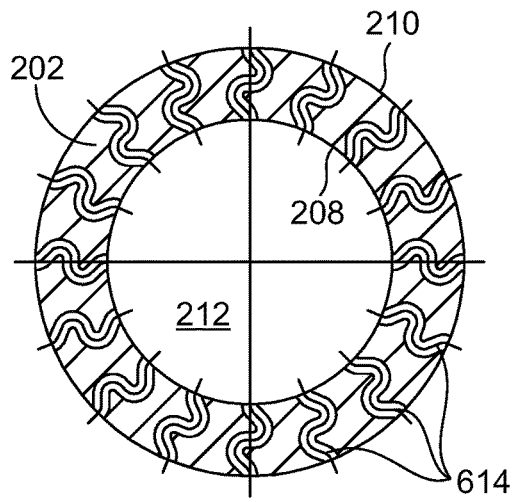
FIG. 7B is a top cross-sectional view of the cage of FIG. 7A taken along the line B-B in FIG. 7A.
Figure 7C:
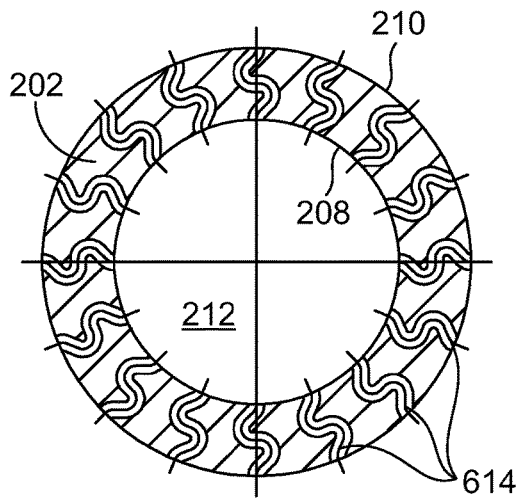
FIG. 7C is a top cross-sectional view of the cage of FIG. 7A taken along the line C-C in FIG. 7A.

FIGS. 5A-C illustrate a fourth example of a cage 400 that can be used with the control valve 10 described above and shown in FIG. 1. Cage 400 can also be manufactured using an Additive Manufacturing Technology process described in detail above for cage 100. Cage 400 is similar to cage 200 described above and uses the same reference numbers for identical parts. The main difference is that in each row, passages 414 alternate the direction of curvature from the horizontally adjacent passage 414. In addition, each alternating vertical row of passages curves has curvature opposite that of the vertically adjacent rows. For example, each arcuate, non-linear passage 414 in the first row (FIG. 5B) has the opposite curvature from its two horizontally adjacent passages and each arcuate non-linear passage 414 in the second row (FIG. 5C) has the opposite curvature from its two horizontally adjacent passages and from passages 414 in vertically adjacent rows.

As described above, passages 414 can have a generally circular cross-sectional area. However, passages 414 can also have other non-circular cross-sectional areas, such as square, rectangle, triangle, oval, star, polygon, and irregular shapes. In addition, the cross-sectional area of passages 414 can vary from inner surface 208 to outer surface 210. For example, passages 414 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210.

FIGS. 6A-C and 7A-C illustrate fifth and sixth examples of cages 500, 600 that can be used with the control valve 10 described above and shown in FIG. 1. Cages 500, 600 can also be manufactured using an Additive Manufacturing Technology process described in detail above for cage 100. Cages 500, 600 are identical to cage 200 described above and use the same reference numbers for identical parts, except that passages 514, 614 have a more complicated curvature than passages 214 of cage 200. For example, cage 500 (FIGS. 6A-C) has arcuate, non-linear passages 514 in the first row (FIG. 6B) that curve from right to left adjacent inner surface 208, curve left to right in the middle of wall 202, and curve right to left adjacent outer surface 210. Conversely, arcuate, non-linear passages 514 in the second row (FIG. 6C) curve from left to right adjacent inner surface 208, curve right to left in the middle of wall 202, and curve left to right adjacent outer surface 210. The arcuate, non-linear passages 614 of cage 600 (FIGS. 7A-C) have an S-shaped configuration. For example, passages 614 in the first row (FIG. 7B) curve from right to left adjacent inner surface 208, curve left to right and back right to left in the middle of wall 202, and curve left to right adjacent outer surface 210. Conversely, passages 614 in the second row (FIG. 7C) curve from left to right adjacent inner surface 208, curve right to left and back left to right in the middle of wall 202, and curve right to left adjacent outer surface 210.

As described above, passages 514, 614 can have a generally circular cross-sectional area. However, passages 514, 614 can also have other non-circular cross-sectional areas, such as square, rectangle, triangle, oval, star, polygon, and irregular shapes. In addition, the cross-sectional area of passages 514, 614 can vary from inner surface 208 to outer surface 210. For example, passages 514, 614 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210.

FIGS. 8A-D illustrate a seventh example of a cage 700 that can be used with the control valve 10 described above and shown in FIG. 1. Cage 700 can also be manufactured using an Additive Manufacturing Technology process described in detail above for cage 100. Cage 700 is similar to cage 200 described above and uses the same reference numbers for identical parts.

As shown in FIGS. 8A-D, cage 700 generally includes a solid, unitary circumferential wall 202 forming a hollow central bore 212, within which the valve plug 26 will slide to control fluid flow through cage 200. Wall 202 defines a first end 204, an opposing second end 206, an inner surface 208, and an opposing outer surface 210. Passages 714 are formed through wall 202 and extend between inner surface 208 and outer surface 210. Passages 714 can be used to characterized fluid flowing through cage 700 by, for example, reducing the pressure of the fluid as it flows through passages 714 or providing a tortured flow path through wall 202 to reduce the velocity of the fluid flowing through cage 700.

Figure 8A:
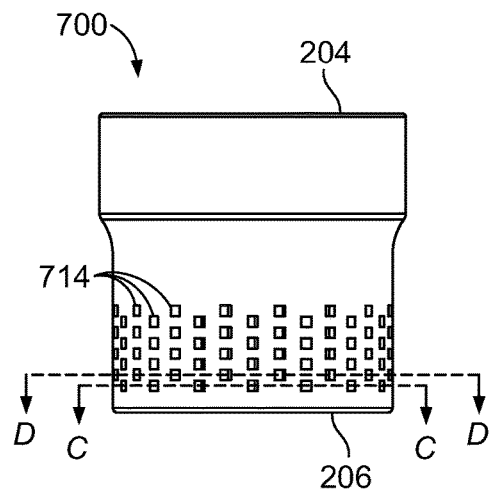
FIG. 8A is a side view of a seventh example cage that can be used with the control valve of FIG. 1.
Figure 8B:
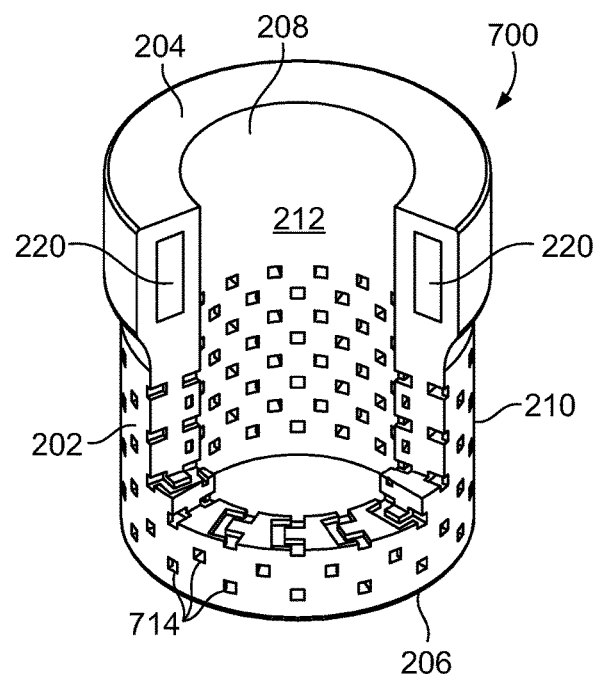
FIG. 8B is a perspective view of the example cage of FIG. 8A with a portion removed to expose the passages.
Figure 8C:
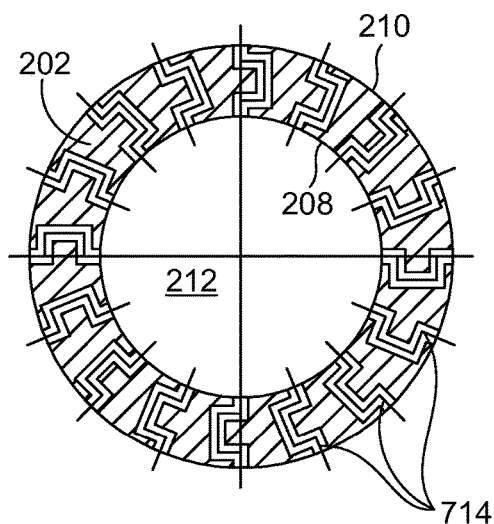
FIG. 8C is a top cross-sectional view of the cage of FIG. 8A taken along the line C-C in FIG. 8A.
Figure 8D:
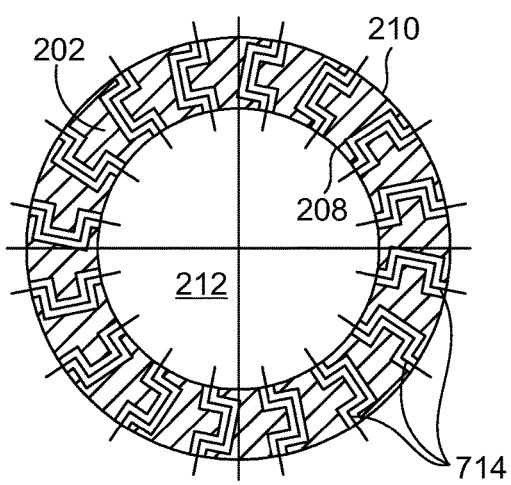
FIG. 8D is a top cross-sectional view of the cage of FIG. 8A taken along the line D-D in FIG. 8A.

In the example shown in FIGS. 8A-D, passages 714 follow a non-linear, generally stair-stepped shaped path from inner surface 208 to outer surface 210 of wall 202, which provides a tortured flow path for the fluid passing through cage 700. For example, as can be seen in FIGS. 8C-D, passages 714 can extend radially from inner surface 208, turn approximately 90 degrees and extend generally tangentially, turn approximately 90 degrees in the opposite direction to extend radially, turn approximately 90 degrees in the same direction to extend generally tangentially, and turn approximately 90 degrees in the opposite direction to extend radially to outer surface 210. In addition, passages 714 in vertically adjacent rows can have stair-stepped shapes that turn in opposite directions. As can be seen in FIG. 8C, passages 714 in the first row turn right, left, left, right, while passages 714 in the second row (FIG. 8D), vertically adjacent the first row, turn left, right, right, left.

Furthermore, as can be seen in FIGS. 8C-D, the locations of passages 714 at outer surface 210 can be angularly offset between vertically adjacent rows so that the exhaust from each vertically adjacent passage does not converge, which can be used to avoid producing aerodynamic noise.

As described above and shown in FIGS. 8A-D, passages 714 can have a generally square cross-sectional area. However, passages 714 can also have other cross-sectional areas, such as circular, rectangle, triangle, oval, star, polygon, and irregular shapes. In addition, the cross-sectional area of passages 714 can vary from inner surface 208 to outer surface 210. For example, passages 714 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210. Furthermore, a sealed cavity 220, such as a "lightning hole" or "weight saver" or manifold, can also be formed in wall 202 of cage 700, to reduce the weight of cage 700 and save material, which was not possible using standard manufacturing techniques.

Figure 9A:
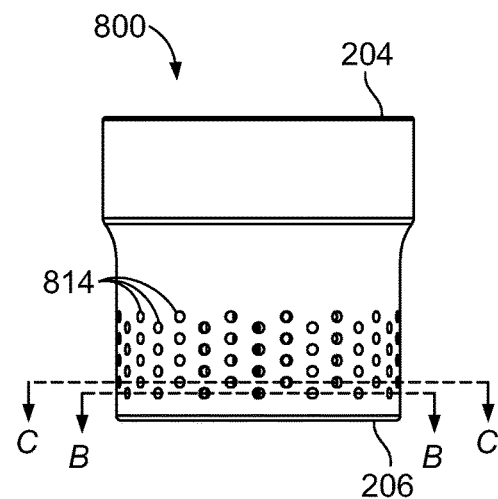
FIG. 9A is a side view of a eighth example cage that can be used with the control valve of FIG. 1.
Figure 9B:
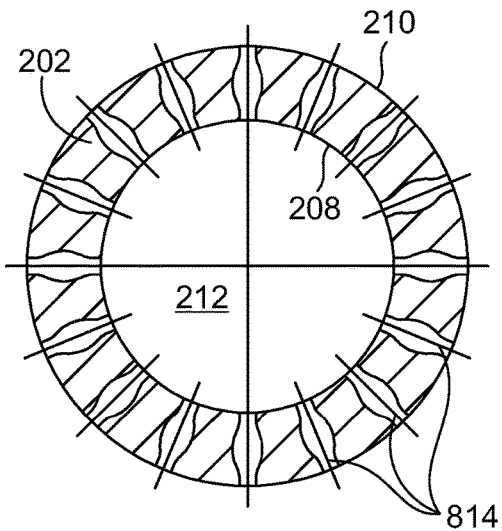
FIG. 9B is a top cross-sectional view of the cage of FIG. 9A taken along the line B-B in FIG. 9A.
Figure 9C:
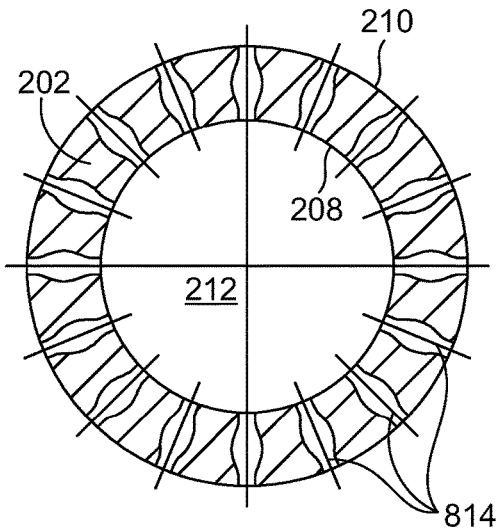
FIG. 9C is a top cross-sectional view of the cage of FIG. 9A taken along the line C-C in FIG. 9A.

FIGS. 9A-C illustrate an eighth example of a cage 800 that can be used with the control valve 10 described above and shown in FIG. 1. Cage 800 can also be manufactured using an Additive Manufacturing Technology process described in detail above for cage 100. Cage 800 is identical to cage 200 described above and uses the same reference numbers for identical parts, except for passages 814 formed through wall 202. In cage 800, passages 814 have a cross-sectional area that varies from inner surface 208 to outer surface 210. In the example shown, the cross-sectional area of passages 814 increases from inner surface 208 to the center of wall 202 and decreases from the center of wall 202 to outer surface 210.

As described above, passages 814 can have a generally circular cross-sectional area. However, passages 814 can also have other non-circular cross-sectional areas, such as square, rectangle, triangle, oval, star, polygon, and irregular shapes. In addition, the cross-sectional area of passages 814 can vary from inner surface 208 to outer surface 210. For example, passages 814 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210.

Figure 10:
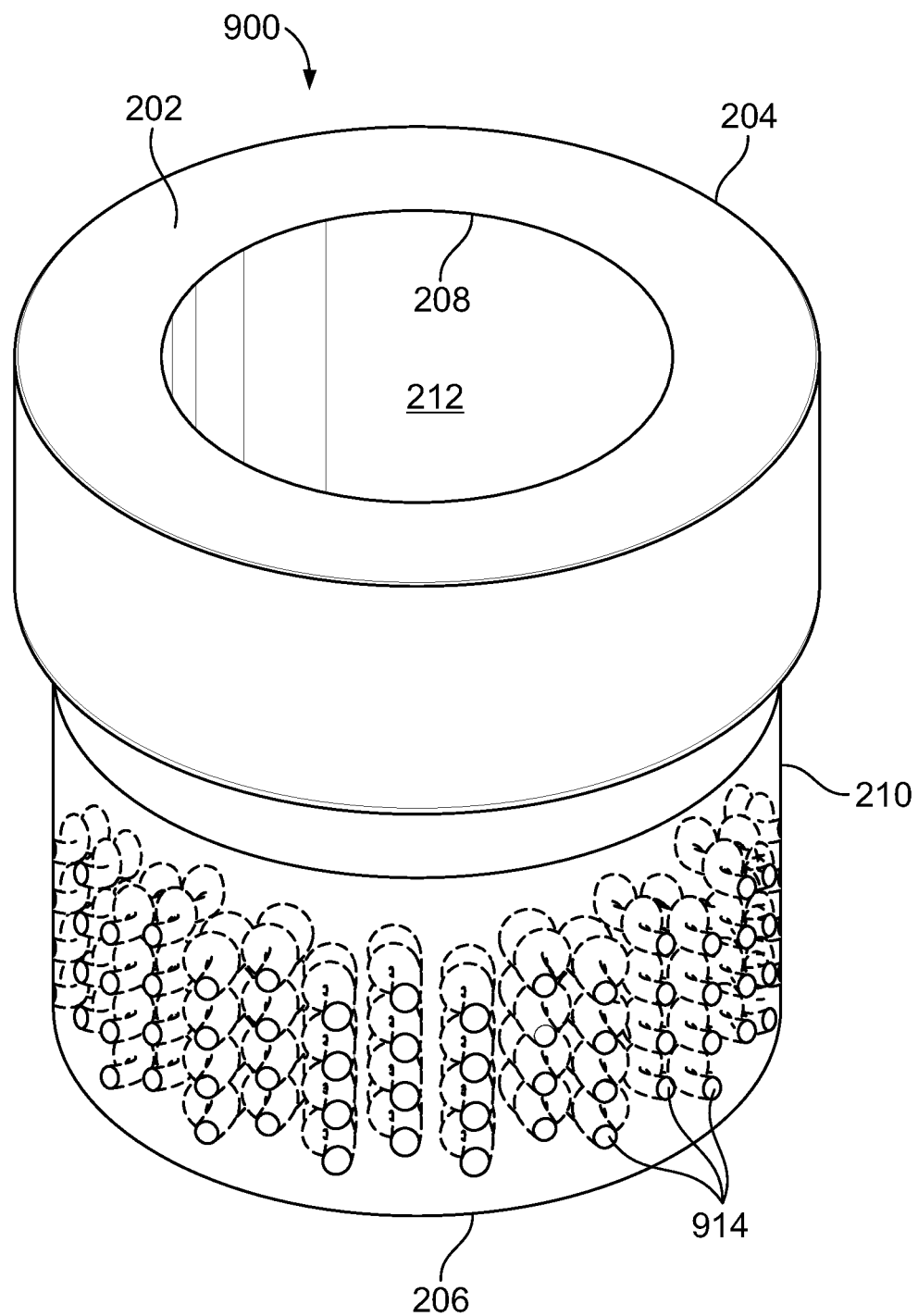
FIG. 10 is a perspective view of a ninth example cage that can be used with the control valve of FIG. 1, with the passages shown in phantom.

FIG. 10 illustrates a ninth example of a cage 900 that can be used with the control valve 10 described above and shown in FIG. 1. Cage 900 can also be manufactured using an Additive Manufacturing Technology process described in detail above for cage 100. Cage 900 is identical to cage 200 described above and uses the same reference numbers for identical parts, except that passages 914 through wall 202 have directional changes in the vertical direction as well as the horizontal direction. In the particular example shown, passages 914 are arcuate and follow a generally helical path through wall 202. Furthermore, the locations of passages 914 at outer surface 210 can be angularly offset between vertically adjacent rows so that the exhaust from each vertically adjacent passage does not converge, which can be used to avoid producing aerodynamic noise.

As described above and shown in FIG. 10, passages 914 can have a generally circular cross-sectional area. However, passages 914 can also have other non-circular cross-sectional areas, such as square, rectangle, triangle, oval, star, polygon, and irregular shapes. In addition, the cross-sectional area of passages 914 can vary from inner surface 208 to outer surface 210. For example, passages 914 can have a decreasing cross-sectional area from inner surface 208 to outer surface 210, an increasing cross-section area from inner surface 208 to outer surface 210, a cross-section area that fluctuates between increased and decreases size, or a cross-sectional area that changes shape as it passes from inner surface 208 to outer surface 210.

Figure 11A:
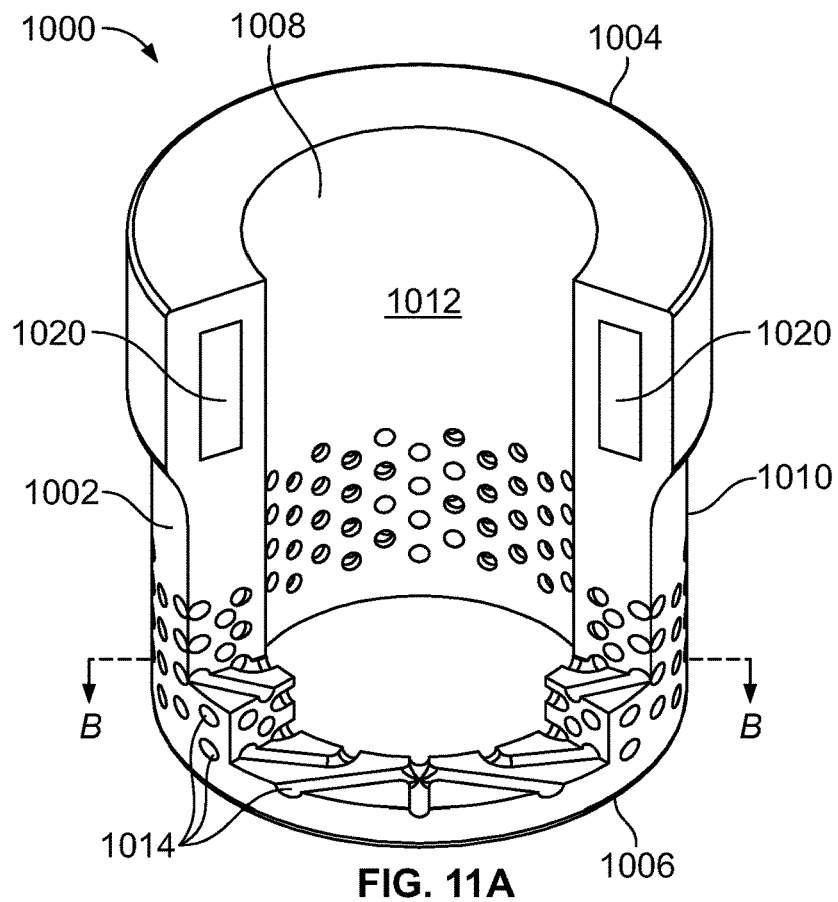
FIG. 11A is a perspective view of an example cage that can be used with a control valve having side to side fluid flow, with a portion removed to expose the passages.
Figure 11B:
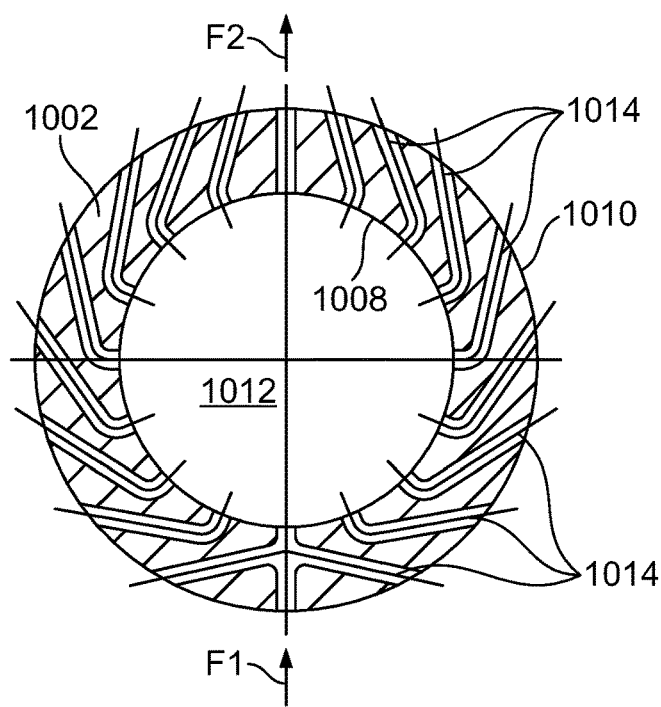
FIG. 11B is a top cross-sectional view of the cage of FIG. 11A taken along the line B-B in FIG. 11A.

FIGS. 11A-B illustrate an example cage 1000 that can be used in control valves having side to side fluid flow, rather than "flow up" or "flow down" fluid flow as described above for control valve 10. As shown in FIG. 11B, in control valves using cage 1000, the inlet flow F1 will enter cage 1000 through one side, pass through circumferential wall 1002 into central bore 1012 and the outlet flow F2 will exit central bore 1012 through the opposite side of cage 1000. Cage 1000 can also be manufactured using an Additive Manufacturing Technology process described in detail above for cage 100.

Cage 1000 generally includes a solid, unitary circumferential wall 1002 forming a hollow central bore 1012, within which the valve plug 26 will slide to control fluid flow through cage 1000. Wall 1002 defines a first end 1004, an opposing second end 1006, an inner surface 1008, and an opposing outer surface 1010. Passages 1014 are formed through wall 1002 and extend between inner surface 1008 and outer surface 1010. Passages 1014 can be used to characterized fluid flowing through cage 200 by, for example, reducing the pressure of the fluid as it flows through passages 1014 or providing a tortured flow path through wall 1002 to reduce the velocity of the fluid flowing through cage 1000.

In the example shown, passages 1014 have both straight portions and arcuate portions and follow a non-linear path from inner surface 1008 to outer surface 1010 of wall 1002 and direct the fluid through cage 1000. In addition, the locations of passages 1014 at outer surface 1010 can be angularly offset between vertically adjacent rows and each row can be "reversed" from adjacent rows so that the exhaust from each vertically adjacent passage does not converge, which can be used to avoid producing aerodynamic noise.

As described above, passages 1014 can have a generally circular cross-sectional area. However, passages 1014 can also have other non-circular cross-sectional areas, such as square, rectangle, triangle, oval, star, polygon, and irregular shapes. In addition, the cross-sectional area of passages 1014 can vary from inner surface 1008 to outer surface 1010. For example, passages 1014 can have a decreasing cross-sectional area from inner surface 1008 to outer surface 1010, an increasing cross-section area from inner surface 1008 to outer surface 1010, a cross-section area that fluctuates between increased and decreases size, or a cross-sectional area that changes shape as it passes from inner surface 1008 to outer surface 1010. Furthermore, a sealed cavity 1020, such as a "lightning hole" or "weight saver" or manifold, can also be formed in wall 1002 of cage 1000, to reduce the weight of cage 1000 and save material, which was not possible using standard manufacturing techniques.

While various embodiments have been described above, this disclosure is not intended to be limited thereto. Variations can be made to the disclosed embodiments that are still within the scope of the appended claims.

What is claimed is:

1. A control valve, comprising:
   a body having an inlet and an outlet;
   a valve seat positioned in a passageway of the body between the inlet and the outlet;
   a valve plug positioned within the body and movable between a closed position, in which the valve plug sealingly engages the valve seat, and an open position, in which the valve plug is spaced away from the valve seat; and
   a cage disposed within the body adjacent the valve seat and proximate the valve plug to provide guidance for the valve plug, the cage comprising:
      a solid, unitary circumferential wall having an inner surface and an outer surface;
      a sealed cavity formed in the wall of the cage; and
      a plurality of passages formed through the wall and extending between the inner surface and the outer surface; wherein
         each of the passages follows an arcuate, non-linear path from the inner surface to the outer surface.

2. The control valve of claim 1, wherein the arcuate, non-linear path is helical.

3. The control valve of claim 1, wherein the arcuate, non-linear path is spiral.

4. The control valve of claim 1, wherein each of the passages comprises a non-circular cross-sectional area.

5. The control valve of claim 4, wherein the cross-sectional area is one of a square, a rectangle, a triangle, an oval, a stars, a polygon, and an irregular shape.

6. The control valve of claim 1, wherein:
   the wall has a first end and a second end; and
   the sealed cavity is spaced apart from the inner surface, the outer surface, the first end, and the second end of the wall.

7. The control valve of claim 1, wherein each of the passages comprises a cross-sectional area that varies from the inner surface to the outer surface.

8. A cage for a control valve, the cage comprising:
   a solid, unitary circumferential wall having an inner surface and an outer surface;
   a sealed cavity formed in the wall of the cage; and
   a plurality of passages formed through the wall and extending between the inner surface and the outer surface; wherein
      each of the passages follows an arcuate, non-linear path from the inner surface to the outer surface.

9. The cage of claim 8, wherein the non-linear path is helical.

10. The cage of claim 8, wherein the non-linear path is spiral.

11. The cage of claim 8, wherein each of the passages comprises a non-circular cross-sectional area.

12. The cage of claim 11, wherein the cross-sectional area is one of a square, a rectangle, a triangle, an oval, a stars, a polygon, and an irregular shape.

13. The cage of claim 8, wherein:
the wall has a first end and a second end; and
the sealed cavity is spaced apart from the inner surface, the outer surface, the first end, and the second end of the wall.

14. The cage of claim 8, wherein each of the passages comprises a cross-sectional area that varies from the inner surface to the outer surface.

* * * * *

UNITED STATES PATENT AND TRADEMARK OFFICE
CERTIFICATE OF CORRECTION

PATENT NO. : 10,539,252 B2  
APPLICATION NO. : 15/673697  
DATED : January 21, 2020  
INVENTOR(S) : Daniel M. Adams et al.

Page 1 of 1

It is certified that error appears in the above-identified patent and that said Letters Patent is hereby corrected as shown below:

In the Specification

At Column 1, Line 8, "2015," should be -- 2015, now U.S. Pat. No. 9,759,348, --.

At Column 3, Line 16, "a stars," should be -- a star, --.

At Column 4, Line 9, "a eighth" should be -- an eighth --.

At Column 6, Line 2, "different that" should be -- different than --.

In the Claims

At Column 10, Line 44, "a stars," should be -- a star --.

At Column 11, Line 2, "a stars," should be -- a star --.

Signed and Sealed this  
Tenth Day of November, 2020

Andrei Iancu  
*Director of the United States Patent and Trademark Office*